UNITED STATES PATENT OFFICE.

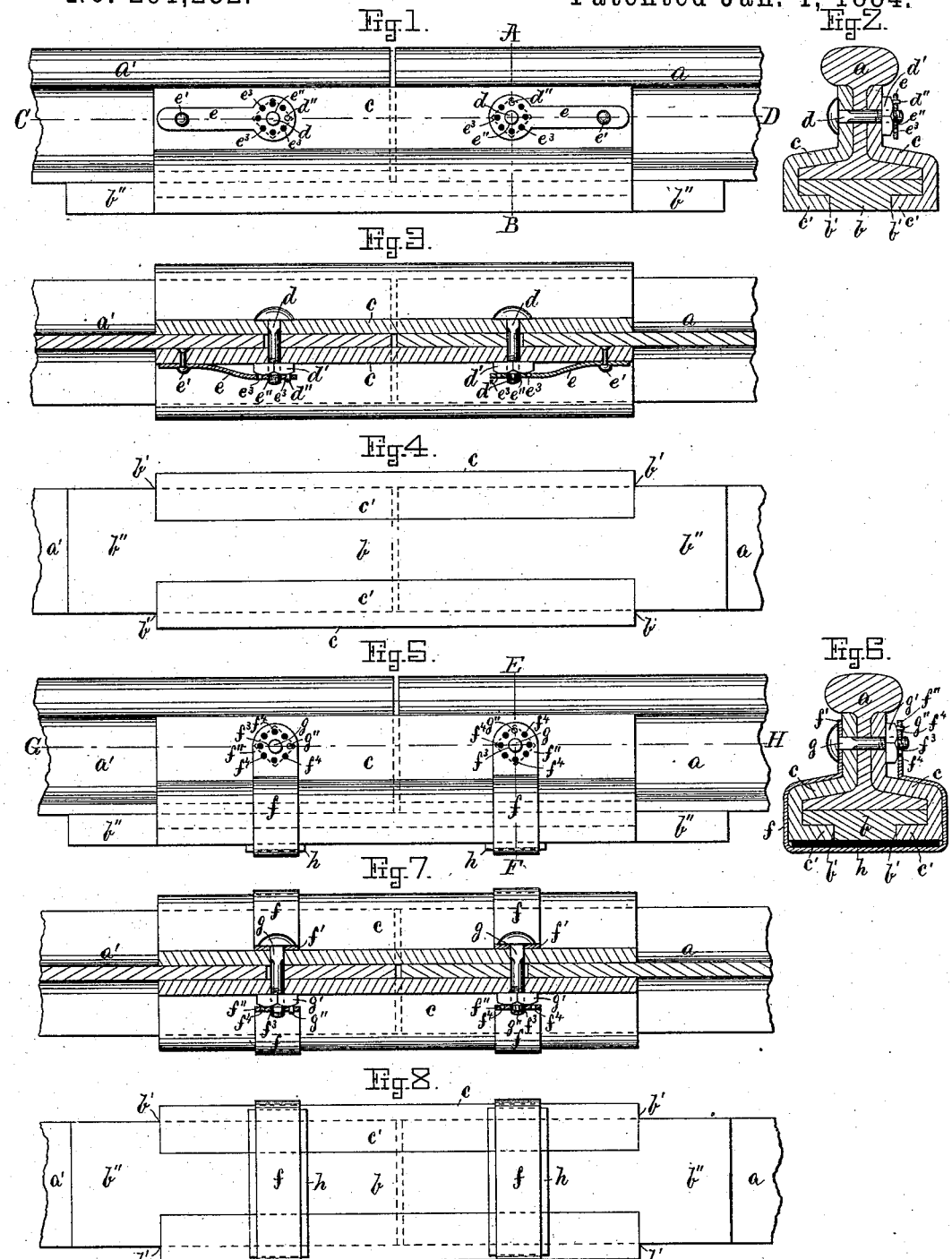

SUMNER SHAW, OF BOSTON, MASSACHUSETTS.

RAILROAD-JOINT AND FASTENING DEVICE.

SPECIFICATION forming part of Letters Patent No. 291,282, dated January 1, 1884.

Application filed February 3, 1883. (No model.)

*To all whom it may concern:*

Be it known that I, SUMNER SHAW, a citizen of the United States, residing at Boston, in the county of Suffolk and State of Massachusetts, have invented certain new and useful Improvements in Railroad-Joints and Fastening Devices; and I do hereby declare that the same are fully described in the following specification and illustrated in the accompanying drawings.

This invention relates to improvements in railroad-joints and fastening devices for rails; and it has for its object means for securing the abutting ends of rails firmly together, as well as preventing the parts at the joint from rattling, as will hereinafter be more fully shown and described.

In carrying out my invention I use a sole-plate combined with interlocking fish-plates at the junction of two rails, with or without an inclosing-strap and elastic packing, as will be further described, reference being had to the accompanying drawings, where—

Figure 1 represents a side elevation of the invention without such inclosing-strap and elastic cushion or packing. Fig. 2 represents a vertical section on the line A B, shown in Fig. 1. Fig. 3 represents a horizontal section on the line C D, shown in Fig. 1; and Fig. 4 represents a bottom view of said Fig. 1. Fig. 5 represents a side elevation of the invention, with the inclosing-strap and elastic packing or cushion. Fig. 6 represents a vertical section on the line E F, shown in Fig. 5. Fig. 7 represents a horizontal section on the line G H, shown in Fig. 5; and Fig. 8 represents a bottom view of Fig. 5.

Similar letters refer to similar parts wherever they occur on the different parts of the drawings.

$a\ a'$ represent the rails, which are to be secured together by means of my improved device. At the junction of said rails, and below them, is laid the sole-plate $b$, which is provided on its under side with a pair of longitudinal recesses, $b'\ b'$, which recesses are made of equal length with the fish-plates $c\ c$, each of which is made with a lower angular lip or flange, $c'$, adapted to rest in the corresponding recess, $b'$, of the sole-plate $b$, the latter extending beyond the ends of the fish-plates $c\ c$ as solid heads $b''\ b''$, by which arrangement both lateral and longitudinal motions of the rails are entirely obviated when the fish-plates and rails are secured together and to the sole-plate by means of the bolts $d\ d$ and their corresponding nuts, $d'\ d'$, as shown in the drawings. The elastic cushion or packing and the inclosing-strap are shown in Figs. 5, 6, 7, and 8, in which figures the sole-plate and fish-plates are constructed, arranged, and combined exactly in the same manner as above described in relation to Figs. 1, 2, 3, and 4. The inclosing-strap $f$ is made of spring metal, and secured in one of its ends $f'$ to one of the fish-plates $c$ by means of the screw-bolt $g$, as shown in Figs. 6 and 7, said strap $f$ to pass downward around the outside of said fish plate and below it, and the sole-plate $b$ extending upward on the side of the opposite fish-plate, and terminating in its free end with a central perforation, $f^3$, adapted to receive the projecting end of the screw-bolt $g$, as shown in Figs. 5, 6, and 7.

In the drawings is shown an improved nut-lock for preventing the nuts on the fastening-bolts from getting loose; and such improved nut-lock will form subject-matter for a future application for a patent.

$h$ is the elastic packing or cushion, preferably made of india-rubber or other elastic material, which is interposed between the bottom of sole-plate $b$, the under side of the fish-plate flanges $c'\ c'$, and the horizontal portion of the inclosing-strap $f$, so as to more effectually prevent all rattling of the fastening devices, as such parts may be abraded or worn while in use.

For ordinary railways I prefer to use the fastening device as shown in Figs. 1, 2, 3, and 4, or one of this kind combined with one of the kind shown in Figs. 5, 6, 7, and 8; but for elevated railways, where it is desirable to avoid as much as possible all noise and rattling, I prefer to use the device as shown in the latter figures.

Having thus fully described the construction and arrangement of my invention, I wish to secure by Letters Patent and claim—

1. The herein-described railroad-joint, consisting of the base-plate $b$, with its side recesses, $b'\ b'$, and headed ends $b''\ b''$, in combination with the fish-plates $c\ c$, their angular flanges $c'\ c'$, and the fastening bolts and nuts $d\ d'$, as and for the purpose set forth.

2. In combination, the sole-plate $b$, fish-plates $c\ c$, bolt and nut $g\ g'$, inclosing-strap $f\ f'\ f''$, and the elastic packing or cushion $h$ interposed between said sole and fish plates and the said inclosing-strap, in a manner and for the purpose as described.

In testimony whereof I have affixed my signature in presence of two witnesses.

SUMNER SHAW.

Witnesses:
 ALBAN ANDRÉN.
 HENRY CHADBOURN.